Jan. 4, 1955
J. H. EAGLE
2,698,765
MAGAZINE CLIP FOR TRANSPARENCIES
Filed Nov. 28, 1951
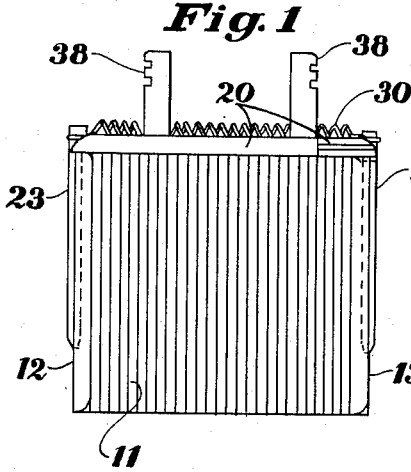
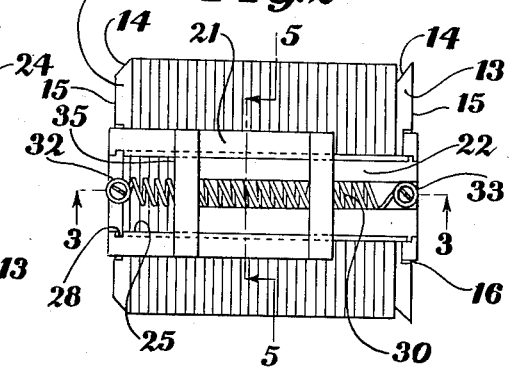
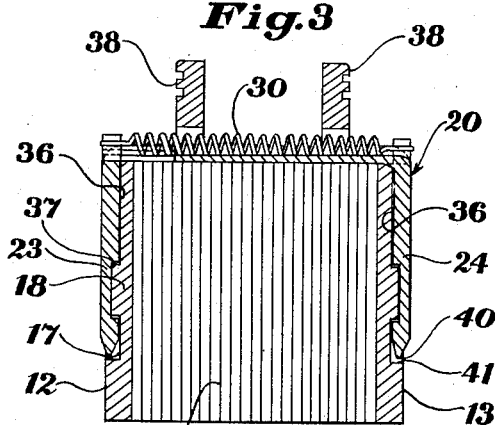
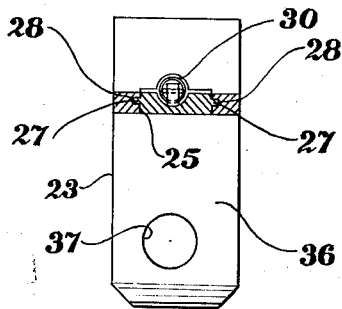
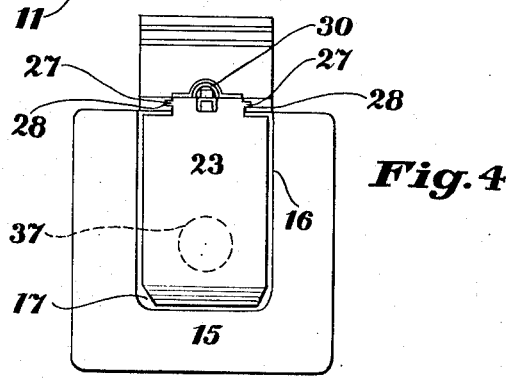
John H. Eagle
INVENTOR.
BY
ATTORNEYS

United States Patent Office 2,698,765
Patented Jan. 4, 1955

2,698,765

MAGAZINE CLIP FOR TRANSPARENCIES

John H. Eagle, Rochester, N. Y., assignor to Eastman Kodak Company, Rochester, N. Y., a corporation of New Jersey Application November 28, 1951, Serial No. 258,620

3 Claims. (Cl. 294—87)

The present invention relates to a magazine loader clip, and more particularly to a clip adapted to be connected releasably to a group of photographic slides or transparency mounts to permit the placing of the group in or removal of the group from the magazine of a slide projector or slide changer. Also, the clip permits a group of slides to be lifted and moved as a unit.

The present invention has as its principal object the provision of a loader clip which can be readily and easily connected to or disconnected from a group of slides or mounts.

Another object of the invention is the provision of a loader clip of the type described which securely clamps a group of slides or mounts to permit the handling and/or moving of the slides or mounts as a unit without disturbing the assembled relation or orientation of the group.

Still another object of the invention is the provision of a loader clip adapted for use with various size packs of slides.

Yet another object of the invention is the provision of a loader clip provided with end plates which engage the end slides or mounts of the pack to protect the slides or mounts against possible damage.

Yet another object of the invention is the provision of a loader clip which is simple in construction, relatively inexpensive to manufacture, and highly effective in use.

To these and other ends the inventive idea resides in certain improvements and combinations of parts, all as will be hereinafter more fully described, the novel features being pointed out in the claims at the end of the specification.

In the drawings:

Fig. 1 is a side elevation view of the magazine loader clip of the present invention showing the relation thereof to a group of photographic slides or mounts;

Fig. 2 is a plan view of the structure illustrated in Fig. 1;

Fig. 3 is a vertical sectional view through the clip illustrated in Fig. 2, and taken substantially on line 3—3 thereof showing the releasable locking means between the loader member and the end plates;

Fig. 4 is an end view of the loader member and end plates;

Fig. 5 is a vertical sectional view through the clip member showing the tongue and groove connection between the members.

Similar reference numerals throughout the various views indicate the same parts.

The magazine loader clip of the present invention is adapted for use with a group of slides or transparency mounts, generally indicated by the numeral 11. As is well known, these transparency mounts or slides usually are in the form of a transparent or light-transmitting film area carrying an image, and mounted in position in a paper mount, or the image-bearing film may be clamped between sheets of glass. As the particular slide or mount construction is well known, and forms no part of the present invention, further details and description of the slides or mounts are not deemed necessary. Suffice it to say, that the loader clip of the present invention will grip a group of slides or mounts and permit the lifting and handling of the groups of slides or mounts as a unit. A group of mounts may be picked up by the loader clip and placed in the supply magazine of a projector or slide changer. Then the loader portion of the clip is released and the slides, with the protective end plates, are in proper relation in the supply magazine. These end plates and the slides are then successively moved into projecting position, and are finally arranged in the take-up magazine in the same relation and the same orientation as they were in the supply magazine.

After the mounts and end plates have been fed into the take-up magazine, the loader portion is again connected to the end plates to remove the latter, and the group of slides, as a unit from the take-up magazine. The group of slides and the end plates may then be positioned in a suitable filing place at which time the loader portion is again disconnected. As the structure of the projector or slide changer may be of any suitable or well known construction, and forms no part of the present invention, such projector or slide changer is not illustrated or described. However, for reasons to be later pointed out, the loader mechanism of the present invention is adapted for use principally with a projector or slide changer in which the slides are arranged in the take-up magazine in the same sequence and in the same orientation as they were in the supply magazine.

Referring now to Figs. 1–3, there is shown a group of slides or transparency mounts 11 arranged in aligned relation to form a group which is in proper sequence and orientation to be placed in the supply magazine of a projector or slide changer. The loader clip of the present invention comprises, in part, end plates 12 and 13 positioned against the opposite ends of the group, as best illustrated in Fig. 3. These end plates 12 and 13 may be formed of any suitable material, such as plastic, and are substantially equal in size to the slides, as is deemed apparent from the drawings. The vertical edges of the end plates are beveled as shown at 14 for reasons to be later described.

The outer face 15 of each end plate 12 and 13 is formed with a recess 16 which is open at its upper end, as best shown in Figs. 3 and 4. The bottom or inner face 17 of each recess has formed thereon an upstanding laterally projecting lug 18, the arrangement and size of which is best shown in Fig. 3.

In order that the end plates 12 and 13, and the slides 11 may be lifted and handled as a unit, a tonglike structure or loader is provided to grip the slides and end plate assembly. This loader comprises a pair of angle members, designated by numeral 20, and formed with connected portions 21 and 22, and depending leg portions 23 and 24. The portion 22 preferably has a width less than that of portion 21 and is positioned in a slot 25 formed in the latter, as best shown in Fig. 2, so that parts 21 and 22 are arranged in sliding or telescoping relation. The opposite side edges of portion 22 are formed with laterally projecting tongues 27 which are adapted to engage in registering slots 28 formed in the adjacent edges of slot 25 to form a tongue and groove connection between portions 21 and 22 to permit relative sliding or telescoping movement of the portions 21 and 22, as is deemed apparent from an inspection of Fig. 2.

It will be apparent from an inspection of Fig. 2 that if the portion 21 is moved to the right relative to portion 22, the leg portions 23 and 24 will be moved relatively toward each other. On the other hand, if the portion 21 is moved to the left relative to portion 22, the leg portions 23 and 24 will be moved away from each other. The portions 23 and 24 are preferably moved toward each other automatically by means of a coil spring 30, one end of which is anchored at 32 to portion 21, and the other end of which is anchored at 33 to portion 22 by means of screws or other suitable fastening means.

In order to limit the movement of the portions 23 and 24 towards each other to provide a minimum space therebetween, the end 35 of portion 22 is adapted to engage the left screw when the portions 23 and 24 have reached their minimum spacing. Such spacing is such as to enable approximately thirty-six paper mounts or slides to be held between the leg portions 23 and 24 of the loader. When the leg portions 23 and 24 are moved towards each other, they are adapted to be received in the recesses 16 of end plates 12 and 13. The inner face 36 of the portions 23 and 24 is formed with a small recess 37 which is arranged in alignment with and is adapted to receive the lug 18, as shown in Fig. 3, to lock the portions 23 and 24 of the loader releasably to the end plates 12 and 13, as clearly illustrated in Fig. 3. Such locking serves to connect the leg portions 23 and 24 to the end plates 12 and 13, and the spring 30 serves to press the leg portions yieldably against the end plates with sufficient force to retain the end plates and the mounts in a tightly packed and assembled relation. The end plates and the mounts may then be picked up and moved as a unit. In this relation, the pack or group of mounts, with the assembled end plates, may be inserted or positioned in the supply magazine of a projector or slide changer.

When the slides 11, with the end plates 12 and 13, are positioned in the supply magazine, the angle members 20 are disconnected from the end plates. To secure this result, the member 21 is moved to the left relative to the member 22 to separate the leg portions 23 and 24. Such separation serves to move the recesses 37 out of locking relation with the lugs 18. Then, by moving the leg members 23 and 24 upwardly, the latter will slide upward along the open-end slots 16 and will be disconnected from the end plates 12 and 13 which now remain in the supply magazine with the pack or group slides 11. To facilitate the disconnecting movement of the leg portions 23 and 24, the portions 21 and 22 have secured to the ends thereof, in any suitable and well known manner, upstanding finger gripping portions 38. The latter are so arranged that when they are grasped and pressed towards each other, they will move the leg portions 23 and 24 away from each other to increase the spacing therebetween to unlock the leg portions from the end plates. The gripping portion 38 forms a convenient handle for lifting and moving the entire assembly. However, when portions 38 are released, the spring 30 will move the leg portions 23 and 24 automatically toward each other to grip the plates 12 and 13. When the gripping portions 38 are moved towards each other a point will finally be reached at which the gripping portions contact to limit the spreading movement of the leg members to provide the maximum spacing which is adapted to receive approximately sixty slides.

It is desirable to position the plates 12 and 13 in the supply magazine along with a group of slides. Plates 12 and 13 are then fed in the same manner as the slides; and, at the end of the complete feeding operation, the pack or group of slides 11, and the end plates 12 and 13 are in proper position in the take-up magazine. In order to insure proper feeding of the end plates, the vertical edges of the latter are beveled, as shown at 14. However, this beveling is so arranged that the plates 12 and 13 will only be fed by the slide-changing mechanism when the pack of slides is arranged in proper sequence and orientation in the supply magazine, the advantages of which are deemed apparent. If the pack of slides is reversed in the supply magazine, the beveled edges 14 of the front plate will be so positioned that the slide-changer will not engage the end plates to feed the latter to the take-up magazine, thus readily indicating to the operator that the pack of slides has been improperly positioned in the slide changer. If desired, the end plates may be of different colors or have different identifying characteristics so that the operator can readily ascertain which end of the pack should be placed toward the slide changer.

When the slides have been completely fed into the take-up magazine, the end plates 12 and 13 will still be positioned at the opposite ends of the pack with the slots 16 on the outer face of the end plates. It will be readily apparent that the end plate near the slide changer will be held tightly thereagainst by reason of the spring pressed follower, not shown, which is usually employed in slide magazines. However, with the open-top slots 16 no difficulty is encountered in easily and quickly sliding the leg members 23 and 24 into the slots of the end plates to lock the latter to the end plates. To secure such connections, the gripping portions 13 are pressed towards each other to separate the portions 23 and 24 the proper amount. Thereupon the leg portions 23 and 24 are slid vertically downward into the slots 16 until the bottom edges 40 of the leg members substantially engage the bottom edges 41 of the slot 16.

The lugs 18 are then in registry with the recesses 37 in the leg portions 23 and 24. The gripping portions 38 are then released and the coil spring 30 then moves the leg portions toward each other to position the lugs 18 in the recesses 37 to connect the leg members to the end plates, and hence to the pack of slides. The portions 38 then may be used as a handle to lift the pack of slides and the end plates as a unit from the take-up magazine. The slides or mounts are now in the same sequence and in the same orientation in which they were in the supply magazine, the advantages of which are deemed apparent. The group of slides with the assembled end plates may then be placed in a suitable storage place whereupon the portions 38 are then pressed towards each other to release the legs 23 and 24 to disconnect the latter from the end plates.

As mentioned above, the loader clip of the present invention is principally adapted for use with a projector or slide changer in which the supply and take-up magazine are so arranged that the slides are fed into the take-up magazine in the same sequence and the same orientation as the slides occupied when in the supply magazine.

The present invention thus provides a loader clip in which the loader portion may be adjusted to receive a group of slides to place the latter with their end plates in position in the supply magazine. After the slides have been projected, the loader is again connected to the end plates to remove the latter and the slides to a suitable place of storage. The loader clip of the present invention is adapted for use with varying size packs of slides. In addition, the end plates protect the exposed area of the slides so as to prevent dirt or finger marking on the image areas. Furthermore, the end plates provide spaces for identifying the title of the pack of slides. Since the end plates are appropriately chamfered or tapered each in relation to the slide changer mechanism, the end plates will be fed through a slide changer only when properly positioned relative thereto. That is, when the pack of slides is arranged in proper end-to-end relation in the supply magazine. By making the end plates different colors the user can easily and quickly ascertain which end of the pack should be positioned toward the slide changer. The pack and end plates assembly can be filed with the loader connected thereto, or the pack and end plates assembly may be filed separately and the loader used only to move the assembly from the file to the supply magazine, and then from the take-up magazine back to the file.

While one embodiment of the invention has been disclosed, it is to be understood that the inventive idea may be carried out in a number of ways. This application is, therefore, not to be limited to the precise details described but is intended to cover all variations and modifications therefor which fall within the scope of the appended claims.

I claim:

1. A magazine loader clip for use with a group of assembled slides comprising, in combination, end plates positioned at opposite ends of said group, a pair of spaced members positionable adjacent and in alignment with said plates, yieldable means connected to said members to move said members toward each other and toward said plates to engage the latter to retain said group in assembled relation, means to connect said members slidably each of said plates having a slot formed on the outer surface thereof to receive one of said members, said yieldably means serving to move said members toward each other and into said slots to press said members yieldably against said plates to hold said plates and group in assembled relation, releasably locking means on said members and plates for securing said plates to said members to permit said plates and group to be moved and lifted as a unit, and releasing means carried by said members and relatively movable for moving said members away from each other to release said locking means and to withdraw said members from said slots to release said plates and group.

2. A magazine loader clip for use with a group of assembled slides comprising, in combination, end plates positioned at opposite ends of said group, a pair of spaced members positionable adjacent and in alignment with said plates, yieldable means connected to said members to move said members toward each other and toward said plates to engage the latter to retain said group in assembled relation, means to connect said members slidably each of said plates having a slot formed on the outer surface thereof to receive one of said members, said yieldably means serving to move said members toward each other and into said slots to press said members yieldably against said plates to hold said plates and group in assembled relation, a laterally projecting lug positioned in each slot and projecting from the outer surface of the plate, each member being formed with an opening adapted to receive the adjacent lug to lock the members releasably to said plates to maintain said plates and group in assembled relation for unitary lifting and moving, and finger gripping members carried by said members for moving the latter away from each other to disengage said lugs from said opening to release said locking means and to permit withdrawal of said members from said slots to release said plates and groups.

3. A magazine loader clip for use with a group of assembled slides comprising, in combination, a pair of end plates positioned in engagement with opposite end slides of said group, the outer face of each plate being formed with an upwardly extending open slot, a lug on each plate projecting into the slot thereof, a pair of spaced clamping members, means to connect said members slidably spring means connected to said members to move the latter toward each other and into said slots to press said member yieldably against said plates to retain said group in assembled relation, means in each plate cooperating with said lugs to lock said members releasably to said plates to permit said plates and group to be lifted and moved as a unit, and finger gripping members on said members for moving the latter away from each other and out of said slots to release said locking means and to disengage said members from said plates to disconnect said group.

References Cited in the file of this patent

UNITED STATES PATENTS

| | | |
|---|---|---|
| 1,261,065 | Smend et al. | Apr. 2, 1918 |
| 1,508,837 | Dippel | Sept. 16, 1924 |
| 1,781,997 | Berezowski | Nov. 18, 1930 |
| 2,353,664 | Greaves | July 18, 1944 |
| 2,508,076 | Palmer | May 16, 1950 |

FOREIGN PATENTS

| | | |
|---|---|---|
| 427,820 | Great Britain | May 1, 1935 |